(12) United States Patent
Sun et al.

(10) Patent No.: US 12,101,656 B2
(45) Date of Patent: Sep. 24, 2024

(54) RADIO (NR) CHANNEL STATE INFORMATION (CSI) CAPABILITY RELATED SIGNALING ENHANCEMENT

(71) Applicant: Apple Inc., Cupertino, CA (US)

(72) Inventors: Haitong Sun, Cupertino, CA (US); David Neumann, Munich (DE); Dawei Zhang, Saratoga, CA (US); Ghaith N. Hattab, Santa Clara, CA (US); Ismael Gutierrez Gonzalez, San Jose, CA (US); Wei Zeng, Saratoga, CA (US); Yeong-Sun Hwang, Germering (DE); Yushu Zhang, Beijing (CN); Ziyang Ju, Munich (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/440,583

(22) PCT Filed: Aug. 5, 2020

(86) PCT No.: PCT/CN2020/107202
§ 371 (c)(1),
(2) Date: Sep. 17, 2021

(87) PCT Pub. No.: WO2022/027359
PCT Pub. Date: Feb. 10, 2022

(65) Prior Publication Data
US 2023/0156502 A1 May 18, 2023

(51) Int. Cl.
*H04W 72/0446* (2023.01)
*H04B 7/06* (2006.01)
(Continued)

(52) U.S. Cl.
CPC .......... *H04W 24/10* (2013.01); *H04B 7/0626* (2013.01); *H04L 5/0051* (2013.01)

(58) Field of Classification Search
None
See application file for complete search history.

(56) References Cited

U.S. PATENT DOCUMENTS 11,057,917 B2 * 7/2021 Manolakos ........... H04L 5/0051
11,233,610 B2 * 1/2022 Xu ........................ H04L 5/0042
(Continued)

FOREIGN PATENT DOCUMENTS

CN  110475264 A  11/2019
CN  110661560 A   1/2020
(Continued)

OTHER PUBLICATIONS

International Search Report and Written Opinion of the International Searching Authority directed to related International Patent Application No. PCT/CN2020/107202, dated Apr. 30, 2021; 8 pages.
(Continued)

*Primary Examiner* — Sithu Ko
(74) *Attorney, Agent, or Firm* — Sterne, Kessler, Goldstein & Fox P.L.L.C.

(57) ABSTRACT

An approach is described for a user equipment (UE) to receive a channel state information (CSI) reporting configuration message from a source device of a first cell and receive a channel state information reference signal (CSI-RS) from a second cell via the source device. The UE determines a first number of CSI-RS resources of a first time slot duration corresponding to the first cell, a second number of CSI-RS resources of a second time slot duration corresponding to the second cell, an overall time slot duration based on the first and the second time slot duration, an overall number of CSI-RS resources of the overall time slot duration based at least on the first and the second number of CSI-RS resource, generates a capability report at least based
(Continued)

on the overall number of CSI-RS resource, and transmits the capability report to the source device.

20 Claims, 9 Drawing Sheets

(51) Int. Cl.
*H04L 5/00* (2006.01)
*H04L 25/00* (2006.01)
*H04W 24/10* (2009.01)

(56) References Cited

U.S. PATENT DOCUMENTS

| | | | | |
|---|---|---|---|---|
| 11,323,902 B2* | 5/2022 | Kwak | ................. | H04B 7/0626 |
| 11,516,652 B2* | 11/2022 | Zhou | ................. | H04L 5/0051 |
| 11,528,115 B2* | 12/2022 | Frenne | ................. | H04L 5/0057 |
| 11,570,781 B2* | 1/2023 | Kim | ................. | H04L 5/0023 |
| 11,729,652 B2* | 8/2023 | Li | ................. | H04L 5/0057 |
| | | | | 370/252 |
| 11,736,169 B2* | 8/2023 | Cha | ................. | H04B 17/327 |
| | | | | 370/329 |
| 2019/0215112 A1 | 7/2019 | Chen et al. | | |
| 2019/0222282 A1 | 7/2019 | Tsai et al. | | |
| 2020/0084714 A1* | 3/2020 | Medles | ................. | H04W 24/10 |
| 2020/0112926 A1* | 4/2020 | Laghate | ................. | H04B 7/0404 |
| 2021/0013941 A1* | 1/2021 | Sun | ................. | H04L 5/0051 |
| 2021/0111776 A1 | 4/2021 | Wu et al. | | |
| 2021/0144569 A1* | 5/2021 | Zhou | ................. | H04B 17/336 |
| 2023/0048322 A1* | 2/2023 | Takahashi | ................. | H04W 8/24 |
| 2023/0179387 A1* | 6/2023 | Papasakellariou | ................. | |
| | | | | H04W 72/0446 |
| | | | | 370/329 |
| 2023/0283429 A1* | 9/2023 | Park | ................. | H04L 1/1854 |
| | | | | 370/329 |

FOREIGN PATENT DOCUMENTS

| | | |
|---|---|---|
| EP | 3537626 A1 | 9/2019 |
| WO | WO 2020032432 A1 | 2/2020 |

OTHER PUBLICATIONS

Oppo et al., "WF on CSI-RS based L3 measurement capability and requirements", R4-2009009, 3GPP TSG-RAN4 Meeting #95e, Electronic Meeting, May 25-Jun. 5, 2020; 8 pages.
Huawei et al., "On CSI-RS measurement capability," R4-2001647, 3GPP TSG-RAN WG4 Meeting #94-e, Online, Feb. 24-Mar. 6, 2020; 4 pages.
Extended European Search Report directed to related European Application No. 20948555.6, mailed Apr. 5, 2024; 13 pages.

* cited by examiner

RADIO (NR) CHANNEL STATE INFORMATION (CSI) CAPABILITY RELATED SIGNALING ENHANCEMENT

This application is a U.S. National Phase of International Application No. PCT/CN2021/107202, filed Aug. 5, 2020, which is hereby incorporated by reference in its entirety.

BACKGROUND

Field

The described aspects generally relate to channel state information (CSI) capability reporting and cross carrier scheduling. For example, some aspects of this disclosure relate to designs for determining and reporting channel state information reference signal (CSI-RS) resources.

Related Art

A user equipment (UE) can communicate with a base station (for example, an evolved Node B (eNB)) in order to report its CSI capability (CSI reporting). For example, the UE can determine the CSI capability, report the CSI capability to the base station, and schedule CSI measurement and CSI reporting.

SUMMARY

Some aspects of this disclosure relate to apparatuses and methods for implementing capability signaling design for 3rd Generation Partnership Project (3GPP) release 15 (Rel-15) and/or release 16 (Rel-16) (and subsequent 3GPP releases) channel state information (CSI) capability reporting and cross carrier scheduling. For example, systems and methods are provided for implementing designs for determining and reporting channel state information reference signal (CSI-RS) resources.

Some aspects of this disclosure relate to a user equipment (UE) connecting to a first cell and a second cell. The UE includes radio frequency front-end (RFFE or radio front-end) circuitry and processor circuitry coupled to the RFFE circuitry. The processor circuitry is configured to determine a first number of CSI-RS resources of a first time slot duration corresponding to the first cell; determine a second number of CSI-RS resources of a second time slot duration corresponding to the second cell; determine an overall time slat duration based on the first and the second time slot durations; and determine an overall number of CSI-RS resources of the overall time slot duration at least based on the first and the second number of CSI-RS resources. The processor circuitry is also configured to generate a capability report based at least on the overall number of CSI-RS resources; and transmit the capability report to a source device. The capability report corresponds to one or more carrier components in a single band or a single band combination of a carrier aggregation.

Some aspects of this disclosure relate to the UE, wherein the radio front end circuitry is configured to receive a channel state information (CSI) reporting configuration message from the first cell; and receive a channel state information reference signal (CSI-RS) from the second cell. The processor circuitry is further configured to: determine a first duration and a second duration for occupying a CSI processing unit of the UE; process the CSI reporting configuration message to trigger a CSI-RS measurement using the CSI processing unit in the first duration; perform the CSI-RS measurement of the CSI-RS using the CSI processing unit in the second duration; generate a CSI report based on the CSI-RS measurement; and transmit the CSI report to the source device.

Some aspects of this disclosure relate to the UE, wherein the first time slat duration is different from the second time slot duration.

Some aspects of this disclosure relate to the UE, wherein the processor circuitry is further configured to compare the first time slot duration and the second time slot duration; and determine that the first time slot duration is smaller than the second time slot duration.

Some aspects of this disclosure relate to the UE, wherein the processor circuitry is further configured to determine that the overall time slot duration is equal to the first time slot duration; and determine that the overall number of CSI-RS resources of the overall time slot duration is equal to a sum of the first number of CSI-RS resources and the second number of CSI-RS resources Some aspects of this disclosure relate to the UE, wherein the processor circuitry is further configured to determine that the overall time slot duration is equal to the second time slot duration; determine that the second time slot duration fully overlaps with a third number of the first time slot durations; and determine that the overall number of CSI-RS resources of the overall time slot duration is equal to sum of the third number times the first number of CSI-RS resources and the second number of CSI-RS resources.

Some aspects of this disclosure relate to the UE, wherein the processor circuitry is further configured to determine a third duration; and generate the CSI report based on the CSI-RS measurement using the CSI processing unit in the third duration. The UE connects to a third cell via the source device.

Some aspects of this disclosure relate to the UE, wherein the first cell is a primary cell and the second cell and the third cell are secondary cells.

Some aspects of this disclosure relate to the UE, wherein the one or more carrier components are in an FR1 frequency range or an FR2 frequency range.

Some aspects of this disclosure relate to the UE, wherein the processor circuitry is further configured to determine one or more supported combinations of CSI-RS measurement types; determine one or more supported combinations of CSI report types; and generate the capability report based on the one or more supported combinations of CSI-RS measurement types and the one or more supported combinations of CSI report types.

Some aspects of this disclosure relate to the UE, wherein the processor circuitry is further configured to determine one or more restricted combinations of CSI-RS measurement types; determine one or more restricted combinations of CSI report types; and generate the capability report based on the one or more restricted combinations of CSI-RS measurement types and the one or more restricted combinations of CSI report types.

Some aspects of this disclosure relate to a method. The method includes determining a first number of CSI-RS resources of a first time slot duration corresponding to the first cell; determining a second number of CSI-RS resources of a second time slot duration corresponding to the second cell; determining an overall time slot duration based on the first and the second time slot duration; determining an overall number of CSI-RS resources of the overall time slot duration at least based on the first and the second number of CSI-RS resource. The method also comprising generating a capability report at least based on the overall number of CSI-RS resources; and transmitting the capability report to the source device. The capability report corresponds to one or more carrier components in a single band or a single band combination of a carrier aggregation.

Some aspects of this disclosure relate to a non-transitory computer-readable medium storing instructions. When the instructions are executed by a processor of a user equipment (UE), the instructions cause the processor to perform operations including determining a first number of CSI-RS resources of a first time slot duration corresponding to the first cell; determining a second number of CSI-RS resources of a second time slot duration corresponding to the second cell; determining an overall time slot duration based on the first and the second time slot duration; determining an overall number of CSI-RS resources of the overall time slot duration at least based on the first and the second number of CSI-RS resource. The operations further include generating a capability report at least based on the overall number of CSI-RS resources; and transmitting the capability report to the source device. The capability report corresponds to one or more carrier components in a single band or a single band combination of a carrier aggregation.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
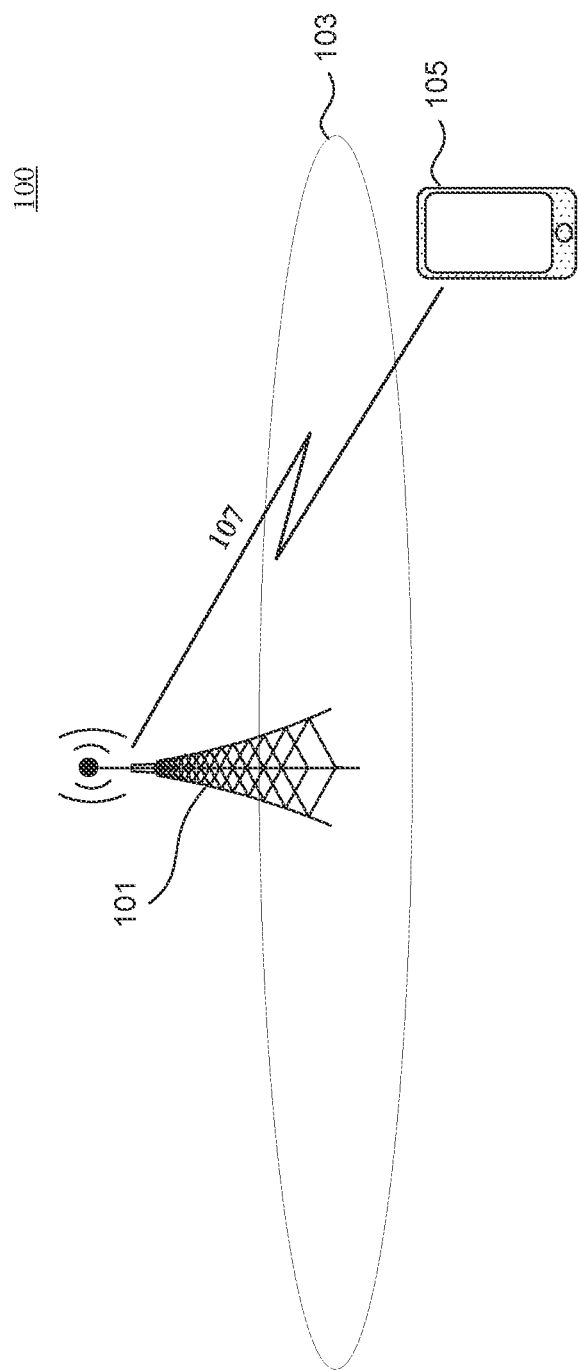
FIG. 1 illustrates an example system implementing designs for New Radio (NR) channel state information (CSI) capability reporting and cross carrier scheduling, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing channel state information (CSI) capability reporting and cross carrier scheduling, e.g., for Rel-15 and/or Rel-16 (and subsequent 3GPP releases). For example, systems and methods are provided for designs associated with determining and reporting channel state information reference signal (CSI-RS) resources. Additionally, systems and methods are provided for cross carrier scheduling for CSI measurement and CSI reporting.

According to some aspects, a UE that operates according to Release 15 (Rel-1.5) and/or Release 16 (Rel-16) (and subsequent 3GPP releases) New Radio (NR) of $5^{th}$ generation (5G) wireless technology for digital cellular networks as defined by 3rd Generation Partnership Project (3GPP) may report channel state information (CSI) to the network with which the UE communicates. For example, the UE may report the CSI to the base station (e.g., a next generation node B (gNB)) with which the UE communicates. According to some aspects, the CSI report may include, but is not limited to, a channel quality indicator (CQI), a precoding matrix indicator (PMI), a CSI-RS resource indicator (CRI), an SS/PBCH (synchronization signals (SS)/physical broadcast channel (PBCH)) Block Resource indicator (SSBRD, a layer indicator (LI), a rank indicator (RI), and/or an L1-RSRP (L1-reference signal received power) value associated with at least a communication link on which the network communicates with the UE.

Resources (for example, CSI-RS ports and/or CSI-RS resources) used by the UE to measure and/or report the CSI are controlled by the base station (e.g., the gNB). According to some examples, the UE uses the CSI-RS ports and/or the CSI-RS resources for the CSI measuring and reporting. The base station controls the resources via a CSI reporting configuration set by the base station. The base station transmits the CSI reporting configuration to the UE via a CSI reporting configuration message, for example, downlink control information (DCI), to trigger a CSI reporting.

According to some aspects, the base station sets the CSI reporting configuration for the UE based on the CSI capability report the base station receives from the UE In some aspects, the CSI capability report may include a number of CSI-RS resources. According to some aspects, the UE determines the number of CSI-RS resources based on the UE's capability. For example, the UE's capability may depend on the UE's memory capability or the UE's computational capability. A UE that is equipped with large capacity memory components and/or high performance processing components may have a greater number of CSI-RS resources and a greater CSI capability. In some aspects, the UE may determine the number of the CSI-RS resources based on properties of the CSI report. For example, the properties of the CSI report may include the memory and/or computation requirements for measuring and reporting the CSI.

According to some aspects, the UE may generate the CSI capability report based on a time slot duration. For example, CSI capability report may indicate the number of the CSI-RS resources that the UE may occupy in the time slot duration. The time slot duration may correspond to a subcarrier spacing (SCS). In an example, if the SCS is 15 KHz, the time slot duration may be 1 ms. In another example, if the SCS is 30 KHz, the time slot duration may be 0.5 ms. The SCS may include 15 KHz, 30 KHz, 60 KHz, 120 KHz, 240 KHz or other values.

According to some aspects, the UE may connect with one or more cells via one or more base stations. For example, the UE may connect with a first cell via the base station. The first cell may be a primary cell. The UE may also connect with a second cell via the base station. The second cell may be a secondary cell.

According to some aspects, the UE may communicate with the first cell using a first SCS and communicate with the second cell using a second SCS. For example, the LIE may communicate with the first cell using the first SCS of 15 KHz and a first time slot duration 1 ins; the UE may communicate with the second cell using the second SCS of 60 KHz and a second time slot duration 0.25 ms. In some aspects, the UE may communicate with the first and the second cells synchronously. Specifically, one first time slot duration may align with four second slot durations. According to some aspects, the UE may determine a first number of CSI-RS resources of the first cell for each of the first time slot durations and a second number of CSI-RS resources of the second cell for each of the second time slot durations.

According to some aspects, the UE may generate the CSI capability report based on the second time slot duration, e.g., a smaller time slot duration. In some examples, the CSI capability report may include an overall number of CSI-RS resources, which may equal a sum of the first number of CSI-RS resources and the second number of CSI-RS resources.

According to some aspects, the UE may generate the CSI capability report based on the first time slot duration, e.g., a larger time slot duration. The CSI capability report may include the overall number of CSI-RS resources, e.g., which may equal to a sum of the first number of CSI-RS resources and four times the second number of CSI-RS resources.

According to some aspects, the UE may communicate with the first and the second cells asynchronously. The UE may determine the CSI capability fir each time slot based on an overlapping situation between the first cell and the second cell. Further details are discussed below.

According to some aspects, the UE may send the CSI capability report to the first cell, e.g., the primary cell. In some aspects, the UE may send the CSI capability report to the second cell, e.g., the secondary cell. In some aspect, the UE may send the CSI capability report to both of the first and the second cells.

According to some aspects, the UE may generate the CSI capability report per band. Therefore, the CSI capability report represents the CST capability of the band. If the band is within a frequency range 1 (FR1), which is between 450 MHz and 6,000 MHz, the CSI capability may not be greater than a first max value. If the hand is within a frequency range 2 (FR2), which is between 24,250 MHz and 52,600 MHz, the CSI Capability may not be greater than a second max value. In some aspects, the first max value is different from the second max value. In some examples, the first max value is equal to 8 and the second max value is equal to 4. In other examples, other first and second max values can be assigned.

According to some aspects, the LIE may generate the CSI capability report per band combination, which combines one or more bands via carrier aggregation. In some aspects, the one or more band in the band combination may share the properties of the CSI report discussed above. In some aspects, the one or more bands may be contiguous bands in a frequency band, non-contiguous bands in the frequency bands or bands in a plurality of frequency hands.

According to some aspects, if the one or more bands include a first portion of the one or more bands in FR1 and a second portion of the one or more bands in FR2, the UE may generate a first CSI capability report corresponding to the first portion of the one or more bands and a second CSI capability report corresponding to the second portion of the one or more bands.

According to some aspects, if the UE generates the CSI capability report indicating support of two aperiodic CSI (AP-CSI), maxNumberAperiodicCSI-PerBWP-ForCSI-Report=2. The UE may indicate in the CSI capability report one or more supported type combinations of a CSI report. In some aspects, the one or more supported type combination may include a first and a second CSI measurement types. The first CSI measurement type may be less computational complex than the second CSI measurement type. For example, the first CSI measurement type may be "Rel-15 Type I Single Panel" and the second CSI measurement type may be "Rel-16 Type II," In some aspects, the one or more supported type combination may include two distinct reporting parameters, e.g., the two distinct reporting parameters that are independent of each other or does not overlap with each other. For example, the two distinct reporting parameters may be a combination of "cri-RI-i1-CQI" and "cri-RSRP" or a combination of "cri-RI-i1-CQI" and "ssb-Index-RSRP."

According to some aspects, the UE may indicate in the CSI capability report one or more restricted type combinations of the CSI report. In some aspect, the one or more restricted type combination may include a third and a fourth CSI measurement types. The third CSI measurement type has a similar computational complexity as the fourth CSI measurement type. For example, the third and the fourth CSI measurement types may be both "Rel-15 Type I Single Panel" or both "Rel-16 Type II." In some aspect, the one or more restricted type combination may include two indistinct reporting parameters, e.g., the two indistinct reporting parameters that are dependent of each other or overlap with each other. For example, the two indistinct reporting parameters may be a combination of "cri-RSRP" and "ssb-Index-RSRP."

According to some aspects, the UE may perform cross carrier scheduling between the first and the second cells. For example, the base station receives the CSI capability report from the UE, generate the CSI reporting configuration message, and send the CSI reporting configuration message to the UE. In some examples, the CSI report configuration message may include DCI. The base station may transmit, in the first cell, the CSI report configuration message to the UE via physical downlink control channel (PDCCH). Therefore, the UE receives the CSI reporting configuration message from the first cell via the base station.

In some aspects, the UE may process the CSI reporting configuration message.

Based on the CSI reporting configuration messages, the UE may trigger to measure a CSI reference signal (CSI-RS) received from the second cell via the base station. In some aspects, the base station may transmit the CSI-RS to the UE.

According to some aspects, the UE may connect to a third cell via the base station. The UE may schedule to generate the CSI report based on a result of measuring the CSI-RS received from the second cell. The UE may also schedule to transmit the CSI report to the third cell via the base station. In some aspects, the UE may schedule to generate and transmit the CSI report based on the CSI reporting configuration message received from the first cell via the base station.

According to some aspects, the UE's processing the CSI reporting configuration message, measuring the CSI-RS, and generating CSI report require computational resources of the UE, for example, CSI processing unit. The UE may indicate, in the CSI capability report, a number of simultaneous CSI processes that the UE is capable of handling. Each of the CSI processes may include CSI steps, such as processing, measuring, and generating discussed above.

According to some aspects, the CSI steps of each CSI process share a CPU resource, e.g., a CSI processing unit. Each of the CSI steps occupies a portion of the CPU resource in time. For example, the CPU resource may have a first duration, a second duration and a third duration. The UE may process the CSI reporting configuration message using the CPU resource in the first duration; the UE may measure the CSI-RS using the CPU resource in the second duration; and the UE may generate the CSI report using the CPU resource in the third duration. In some aspect, the second duration may be larger than the first duration and/or the third duration, FIG. 1 illustrates an example system 100 implementing designs for New Radio (NR) channel state information (CSI) capability reporting and cross carrier scheduling, according to some aspects of the disclosure. Example system 100 is provided for the purpose of illustration only and does not limit the disclosed aspects. System 100 may include, but is not limited to, a base station 101, such as an eNB, a gNB, etc. and an electronic device, represented as UE 105. UE 105 may be implemented as an electronic device configured to operate based on a wide variety of wireless communication techniques. These techniques may include, but are not limited to, techniques based on 3rd Generation Partnership Project (3GPP) standards. For example, the UE 105 may include an electronic device configured to operate using one or more 3GPP releases, such as Release 15 (Rel-15), Release 16 (Rel-16), or subsequent 3GPP releases. The UE 105 may include, but is not limited to, wireless communication devices, smart phones, laptops, desktops, tablets, personal assistants, monitors, televisions, wearable devices, Internet of Things (IoT) devices, vehicle communication devices, and the like. The base station 101 may include one or more nodes configured to operate based on a wide variety of wireless communication techniques such as, but not limited to, techniques based on 3GPP standards. For example, the base station 101 may include nodes configured to operate using Rel-15, Rel-16, or subsequent 3GPP releases. In some aspects, the base station 101 may belong to a cell 103. The UE 105 may connect with the cell 103 via the base station 101. The cell 103 may be a primary cell of the UE 105.

The UE 105 may connect to and communicate with the base station 101 using one or more communication links 107. Each of the communication link may include at least one uplink (UL) connections and at least one downlink (DL) connections. According to some aspects, the UE 105 may determine its CSI capability and generate a CSI capability report. The UE 105 may transmit the CSI capability report to the base station 101 via one of the at least one UL connections. The base station 101 may generate a CSI reporting configuration message, e.g., downlink control information (DCI), and transmit the CSI reporting configuration message to the UE 105 via one of the at least one DL connections.

According to some aspects, the UE 105 may connect to a second cell (not shown) via the base station 101. According to some aspects, the base station may generate a CSI-RS and transmit the CSI-RS, in the second cell, to the UE 105 via a downlink (DL) connection between the base station 101 and the UE 105. In some aspect, the UE 105 may trigger to measure the CSI-RS based on the CSI reporting configuration message.

According to some aspects, the UE 105 may connect to a third cell via the base station 101. The UE 105 may generate a CSI report based on a result of measuring CSI-RS. The UE 105 may transmit, in the third cell, the CSI report to the base station 101 via an uplink (UL) connection between the UE 105 and the base station 101.

According to some aspects, the LIE may indicate one or more cells that are allowed to trigger/schedule measuring the CSI-RS received from the second cell. For example, the UE, may indicate that the first cell is allowed to trigger/schedule measuring the CSI-RS received from the second cell. If the UE receives a second CSI reporting configuration message from the third cell via the base station 101 to trigger measuring the CSI-RS received from the second cell, the UE may deny the triggering. In some aspect, a CSI-RS received from a primary cell, e.g., the first cell, may only be triggered/schedule by the CSI reporting configuration message received from a primary cell, e.g., the first cell.

According to some aspects, the CSI reporting process including CSI-RS measurement may be triggered with different CSI reports, e.g., ReportConfigId, wherein each report may be based on a CSI-RS measurement in a different carrier. In some aspects, corresponding CPU resources, such as processing units discussed above, for each CSI reporting process are occupied on the carrier that UE performs the CSI-RS measurement for the CSI reporting process.

In some aspects, the CSI reporting process including CSI-RS measurement may be triggered with multiple CSI reports. e.g., ReportConfigId. For each ReportConfigId, all of CSI-RS for both channel measurement and interference measurement, e.g., CMR/CSI-IM/NZP-IMR, are located in a same component carrier. Alternatively, for all of CSI reporting processes, all of CSI-RS for both channel measurement and interference measurement, e.g., CMR/CSI-IM/NZP-IMR, are located in a same component carrier.

Figure 2:
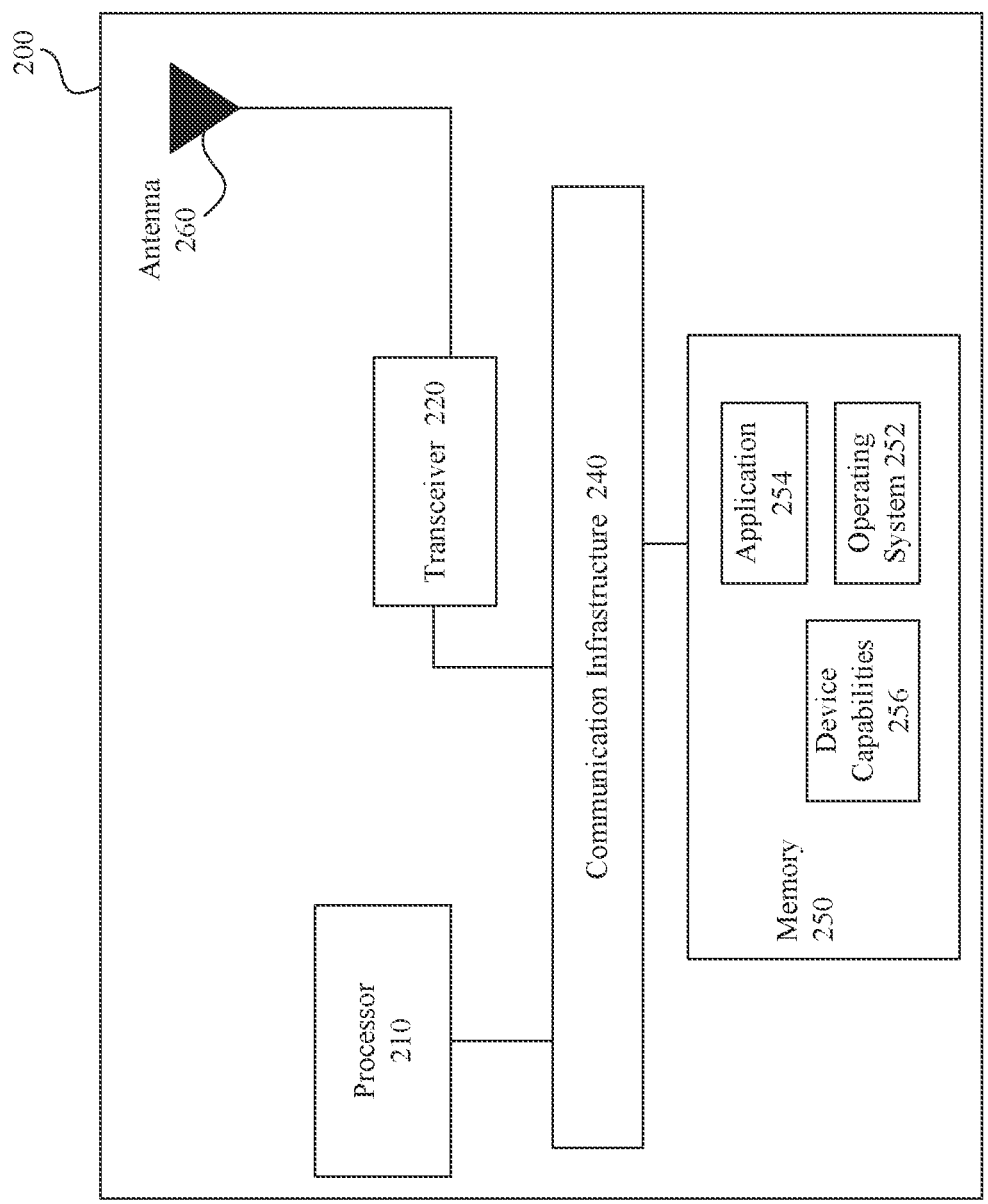
FIG. 2 illustrates a block diagram of an example system of an electronic device implementing designs for New Radio (NR) channel state information (CSI) capability reporting and cross carrier scheduling, according to some aspects of the disclosure.

FIG. 2 illustrates a block diagram of an example system 200 of an electronic device implementing mechanisms for designs for New Radio (NR) channel state information (CSI) capability reporting and cross carrier scheduling, according to some aspects of the disclosure. The system 200 may be any of the electronic devices (e.g., a base station 101, an UE 105) of the system 100. The system 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus. The processor 210 together with instructions stored in the memory 250 performs operations enabling system 200 of the system 100 to implement mechanisms for CSI capability reporting and cross carrier scheduling, as described herein. Additionally, or alternatively, the one or more transceivers 220 perform operations enabling the system 200 of system 100 to implement mechanisms for NR CSI capability reporting and cross carrier scheduling, as described herein.

The one or more transceivers 220 transmit and receive communications signals that support mechanisms for NR CSI capability reporting and cross carrier scheduling. Additionally, the one or more transceivers 220 transmit and receive communications signals that support mechanisms for measuring communication link(s), and generating and transmitting CSI reports. According to some aspects, the one or more transceivers 220 may be coupled to antenna 260. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or subsequent releases of 3GPP standard.

According to some aspects of this disclosure, the processor 210, alone or in combination with computer instructions stored within the memory 250, and/or the one or more the transceiver 220, implements the methods and mechanisms discussed in this disclosure. For example, the processor 210, alone or in combination with computer instructions stored within the memory 250, and/or the one or more transceiver 220, implements mechanisms for NR CSI capability reporting and cross carrier scheduling. According to some aspects of this disclosure, the processor 210, alone or in combination with computer instructions stored within the memory 250, may determine UE's CSI capability based on properties of the processor 210 and/or the memory 250. In some aspects, the processor 210, alone or in combination with computer instructions stored within the memory 250, may determine the UE's CSI capability based on memory requirement and/or computational complex of processing a CSI reporting. In some aspect, the processor 210, alone or in combination with computer instructions stored within the memory 250, and/or the one or more transceiver 220, may generate a CSI capability report and transmit it to a base station (for example the base station 101 of FIG. 1).

According to some aspects, the memory 250 may include the device capabilities 256. The device capabilities 256 may include information indicating that the system 200 is configured to process a CSI reporting configuration message received from the base station, measure a CSI-RS received, and generate a CSI report based on a result of measuring the CSI-RS.

According to some aspects, the processor 210 may include one or more processing units, for example, one or more CSI processing unit. A number of the one or more processing unit may indicate a number of simultaneous CSI processes that the UE may support. In some aspect, the CSI reporting configuration message sent from the base station to the UE may request a number of CSI report that is less than the number of the one or more processing units.

As discussed in more detail below with respect to FIGS. 3-8, processor 210 may implement different mechanisms for CSI capability reporting and cross carrier scheduling as discussed with respect to the system 100 of FIG. 1.

Figure 3:
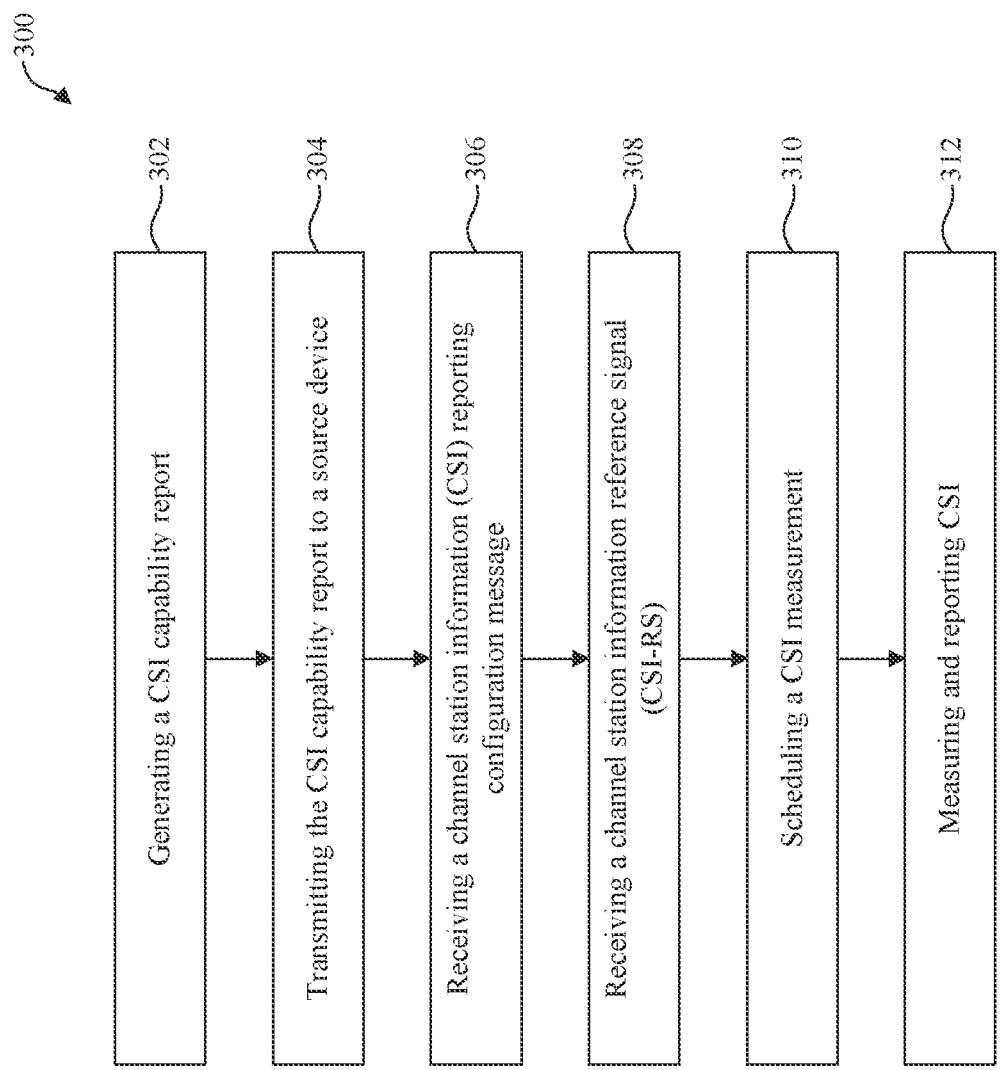
FIG. 3 illustrates an example method for a system (for example a user equipment (UE)) supporting mechanisms for channel state information (CSI) capability reporting and cross carrier scheduling, according to some aspects of the disclosure.

FIG. 3 illustrates an example method 300 for a system (for example a user equipment (UE)) supporting CSI capability reporting and cross carrier scheduling, according to some aspects of the disclosure. As a convenience and not a limitation, FIG. 3 may be described with regard to elements of FIGS. 1, 2, and 9. Method 300 may represent the operation of an electronic device (for example, UE 105 of FIG. 1) implementing CSI capability reporting and cross carder scheduling. Method 300 may also be performed by system 200 of FIG. 2 and/or computer system 900 of FIG. 9. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, a UE generates a CSI capability report. As discussed above, the UE may generate the CSI capability report based on the UE's memory components and processing units, for example, the memory 250 and the processor 210 of FIG. 2. The UE may also generate the CSI capability report based on the memory requirement and computational complexity of the CSI report. More details are discussed below in FIG. 4.

At 304, the UE transmits the CSI capability report to the base station (for example, the base station 101 of FIG. 1) via an UL connection (for example, an UL connection in the one or more communication links 107 of FIG. 1).

At 306, the UE receives a channel state information (CSI) reporting configuration message from the base station. The CSI reporting configuration message may include a request for CSI report updates from the UE. In some aspects, the CSI reporting configuration message may include DCI. The base station may generate the CSI reporting configuration message based on the CSI capability report received from the UE. For example, the CSI capability report may request a number of CSI-RS resources. The base station may generate the CSI reporting configuration message based on the number of CSI-RS resources.

At 308, the UE receives a channel state information reference signal (CSI-RS) from the base station, which belongs to a first cell. The first cell may be a primary cell of the UE. In some aspects, the UE may receive the CSI-RS from a second cell via the base station. The second cell may be a secondary cell.

At 310, the UE processes the CSI reporting configuration message and triggers the CSI reporting by scheduling a CSI measurement. In some aspect, the UE may schedule the CSI measurement of the CSI-RS received from the second cell.

At 312, the UE measures the CSI-RS, generates a CSI report based a result of the measuring, and sends the CSI report to the base station.

Figure 4:
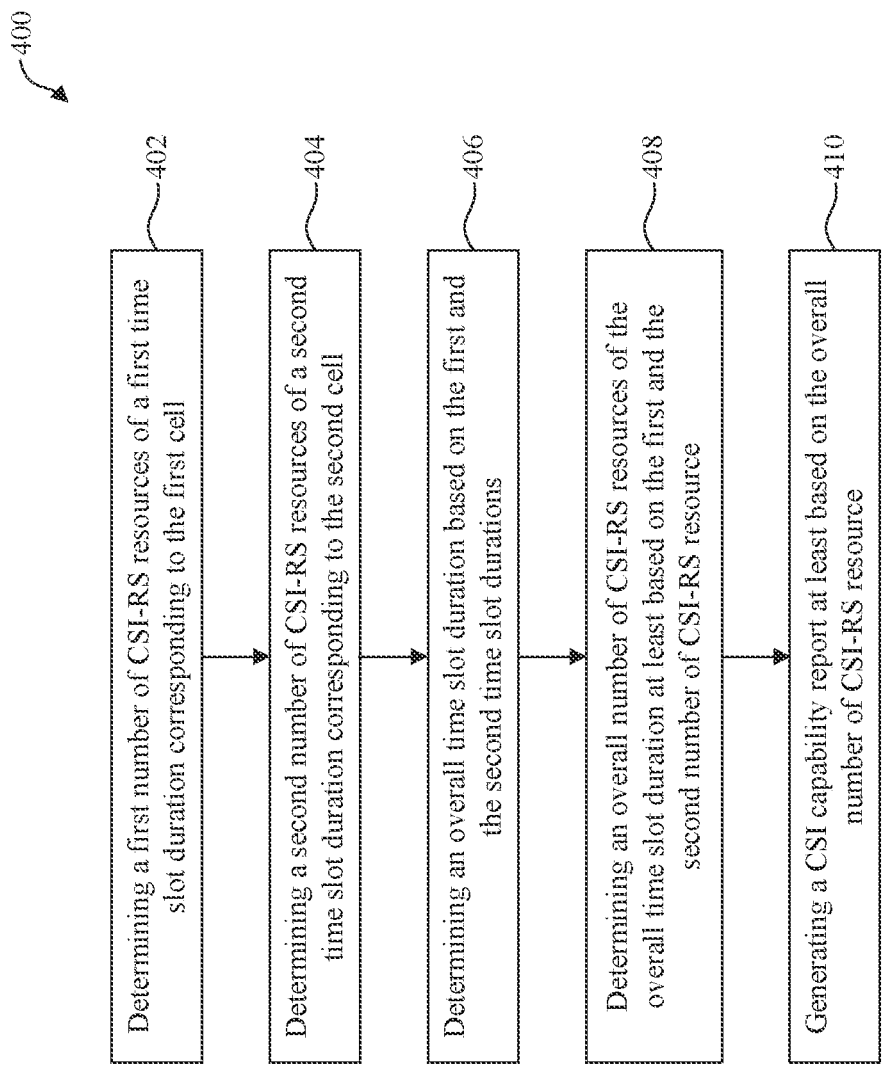
FIG. 4 illustrates an example method for a system (for example a user equipment (UE)) supporting mechanisms for channel state information (CSI) capability reporting, according to some aspects of the disclosure.

FIG. 4 illustrates an example method 400 of step 302 of FIG. 3, according to some aspects of the disclosure. As a convenience and not a limitation, FIG. 4 may be described with regard to elements of FIGS. 1, 2, and 9. Method 400 may represent the operation of an electronic device (for example, base station 101 of FIG. 1) implementing CSI capability reporting. Method 400 may also be performed by system 200 of FIG. 2 and/or computer system 900 of FIG. 9. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, the UE determines a first number of CSI-RS resources of a first time slot duration corresponding to the first cell. For example, the UE may be capable of processing four CSI reports for the first cell or carrier components of the first cell during the first time slot duration. The first time slot duration is corresponding to a SCS of the first cell. For example, if the SCS of the first cell is 15 KHz, the first time slot duration may be 1 ms. In another example, if the SCS of the first cell is 30 KHz, the first time slot duration may be 0.5 ms. The SCS may include 15 KHz, 30 KHz, 60 KHz, 120 KHz, 240 KHz or anything other values.

The UE may determine the first number of the CSI-RS resources based on the capability of the UE, e.g., size of the memory components such as the memory 250 of FIG. 2) or computational capability of the processor (such as the processor 210 of FIG. 2) The UE may also determines the first number of the CSI resources based on the memory requirement and computation complexity of the CSI report, e.g., the SCS of the first cell, a size of carrier components of the first cell, and types of the CSI report.

At 404, the UE determines a second number of CSI-RS resources of a second time slot duration corresponding to the second cell. The UE may determine the second number of the CSI-RS resources in a similar way as described in step 402. In some aspects, the second time duration may be different from the first time duration because the SCS of the first cell may be different from the SCS of the second cell.

Figure 5:
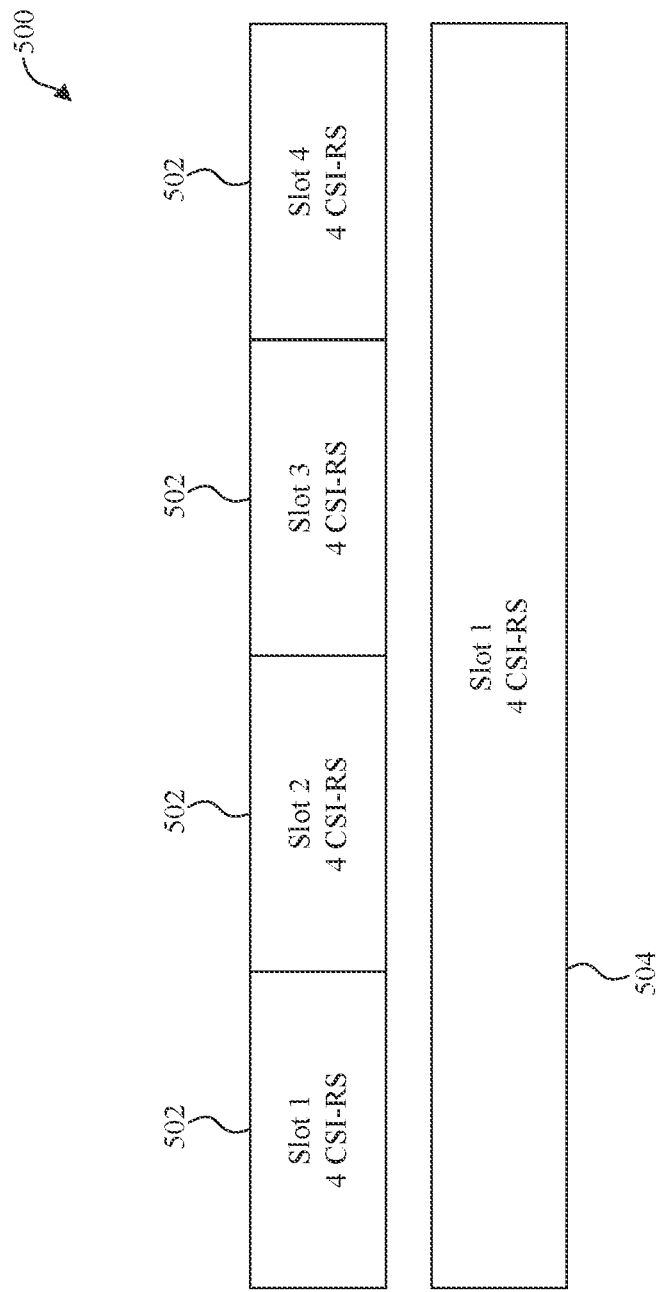
FIG. 5 illustrates an example of the time slot durations of the first cell and the cell in a synchronous condition, according to some aspects of the disclosure.

At 406, the UE determines an overall time slot duration based on the first and the second time slot duration. The UE may determine that the overall time slot duration is equal to a small one of the first time slot duration and the second time slot duration. For example, as shown in FIG. 5, the first time slot duration may be slot 502 and the second time slot duration may be slot 504. In an embodiment, a length of slot 502 may be 0.25 ms and a length of slot 504 may be 1 ms. The UE may determine that slot 502 is smaller and the overall time slot duration is equal to slot 502, e.g., 0.25 ms. Alternatively, the UE may determine that the overall time slot duration is equal to a larger time slot duration. Similar to above discussion, the UE may determine that the overall time slot duration is equal to slot 504, e.g., 1 ms.

At 408, the UE determines an overall number of CSI-RS resources of the overall time slot duration at least based on the first and the second number of CSI-RS resource. In some aspects, the UE determines the overall number of the CSI-RS resources for all connecting cells, such as the first cell and the second cell. In some aspects, time slots of the first cell and the second cell may be synchronous. For example, as shown in FIG. 5, slot 504 aligns with four slots 502.

According to some aspects, if the UE determines that the overall time slot duration is equal to slot 502, the overall time slot duration is covered by one slot 502 and one slot 504. For example, as shown in FIG. 5, one slot 502 has 4 CSI-RS resources and one slot 504 has 4 CSI-RS resources. The UE may determine that the overall number of the CSI-RS resources is equal to 8 CSI-RS resources, which is a sum of numbers of CSI-RS resources of one slot 502 and one slot 504.

In some aspects, the UE determines the overall number of the CSI-RS resources for each time slot, e.g., each slot 502 shown in FIG. 5. As discussed above, the UE may determine that the overall number of the CSI-RS resources for each slot 502 is equal to 8 CSI-RS resources. Alternatively, the 4 CSI-RS resource in slot 504 may be counted no more than once when determining the overall number of the CSI-RS resources. For example, the UE may determine the overall number of the CSI-RS resources of first slot 502 is equal to 8 and each of the overall number of the CSI-RS resources of second slot 502, third slot 502 and fourth slot 502 is equal to 4.

According to some aspects, if the UE determines that the overall time slot duration is equal to slot 504, the UE max determine that the overall number of the CSI-RS resources of slot 504 is equal to a number CSI-RS resources of all time slots covered by slot 504. For example, the UE may determine that the overall number of the CSI-RS resources of slot 504 is equal to 20, which is a sum of the number CSI-RS resources of one slot 504 and the number CSI-RS resources of four slots 502.

Figure 6:
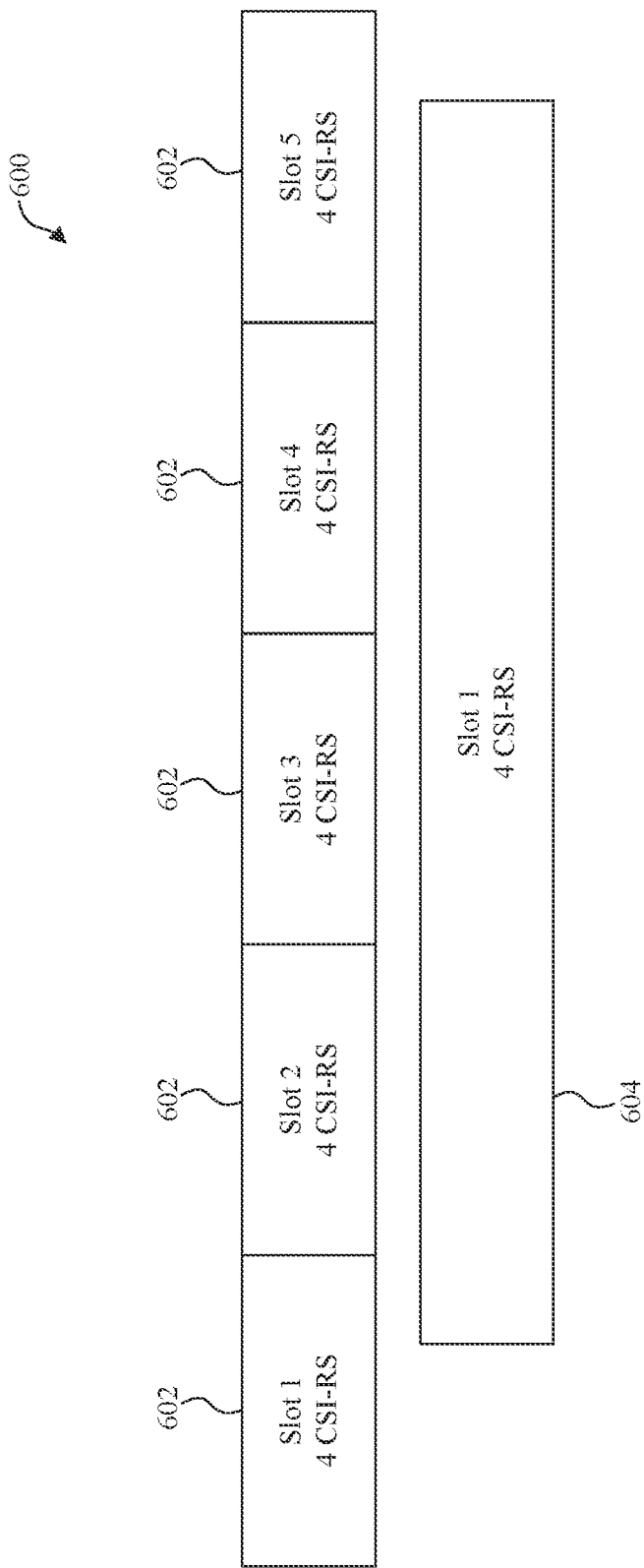
FIG. 6 illustrates an example of the time slot durations of the first cell and the cell in an asynchronous condition, according to some aspects of the disclosure.

In some aspects, time slots of the first cell and the second cell may be asynchronous. For example, as shown in FIG. 6, slot 604 misaligns with five slots 602. If the UE determines that the overall time slot duration is equal to slot 602, e.g., the smaller time slot duration, the UE may determine the overall number of CSI-RS for each slot 602. In some aspects, the CSI-RS resources of slot 604 may be counted if slot 602 fully overlaps with slot 604. For example, slot 604 fully overlaps with second slot 602, third slot 602 and fourth slot 602 in FIG. 6. The UE may determine that the overall number of the CSI-RS resources of the second, third, and fourth slots 602 to be 8 and the overall number of the CSI-RS resources of first slot 602 and fifth slot 602 to be 4.

In some aspects, the CSI-RS resources of slot 604 may be counted if slot 604 partially or fully overlaps with slot 602. For example, slot 604 partially overlaps with the first and fifth slot 602 and fully overlaps with the second, the third and the fourth slot 602. The UE may determine that the overall number of the CSI-RS resources of each slot 602 is equal to 8.

In some aspects, the CSI-RS resources of slot 604 may be counted if slot 604 overlaps with more than 50% of slot 602. For example, slot 604 overlaps with less than 50% of the first slot 602 and more than 50% of each of other slot 602 shown in FIG. 6. The UE may determine that the overall number of the CSI-RS resources of the first slot 602 is equal to 4 and the overall number of the CSI-RS resources of all other slot 602 is equal to 8.

In some aspects, if the UE determines that the overall time slot duration is equal to slot 604, e.g., the larger time slot duration, the UE may determine the overall number of CSI-RS for each slot 604. In some aspects, the CSI-RS resource of slot 602 may be counted if slot 602 fully overlaps with slot 604. For example, the first, the second and the third slot 602 fully overlap with slot 604. The UE may determine that the overall number of CSI-RS resources of slot 604 is equal to 16.

In some aspects, the CSI-RS resources of slot 602 may be counted if slot 602 partially or fully overlaps with slot 604. For example, all slots 602 shown in FIG. 6 partially or fully overlaps with slot 604. The UE may determine that the overall number of the CSI-RS resources is equal to 24.

In some aspects, the CSI-RS resources of slot 602 may be counted if more than 50% of slot 602 overlaps with slot 604. For example, slot 604 overlaps with less than 50% of the first slot 602 and more than 50% of each of other slot 602 shown in FIG. 6. The UE may determine that the overall number of the CSI-RS resources is equal to 20.

At 410, the UE generates a CSI capability report at least based on the overall number of CSI-RS resources. For example, the CSI capacity report may include the overall number of the CSI-RS resources of the overall time slot duration and other parameters.

FIG. 5 illustrates an example of the time slot durations of the first cell and the second cell in a synchronous condition, wherein slots 502 are corresponding to the first cell and slot 504 is corresponding to the second cell. As discussed above, slot 504 fully overlaps with 4 slot 502. Each of slot 502 and slot 504 has 4 CSI-RS resources.

FIG. 6 illustrates an example of the time slot durations of the first cell and the second cell in an asynchronous condition, wherein slots 602 are corresponding to the first cell and slot 604 is corresponding to the second cell. As discussed above, slot 604 fully overlaps with the second, the third, and the four slots 502 and partially overlaps with the first and the fifth slots 502. Each of slot 502 and slot 504 has 4 CSI-RS resources.

Figure 7:
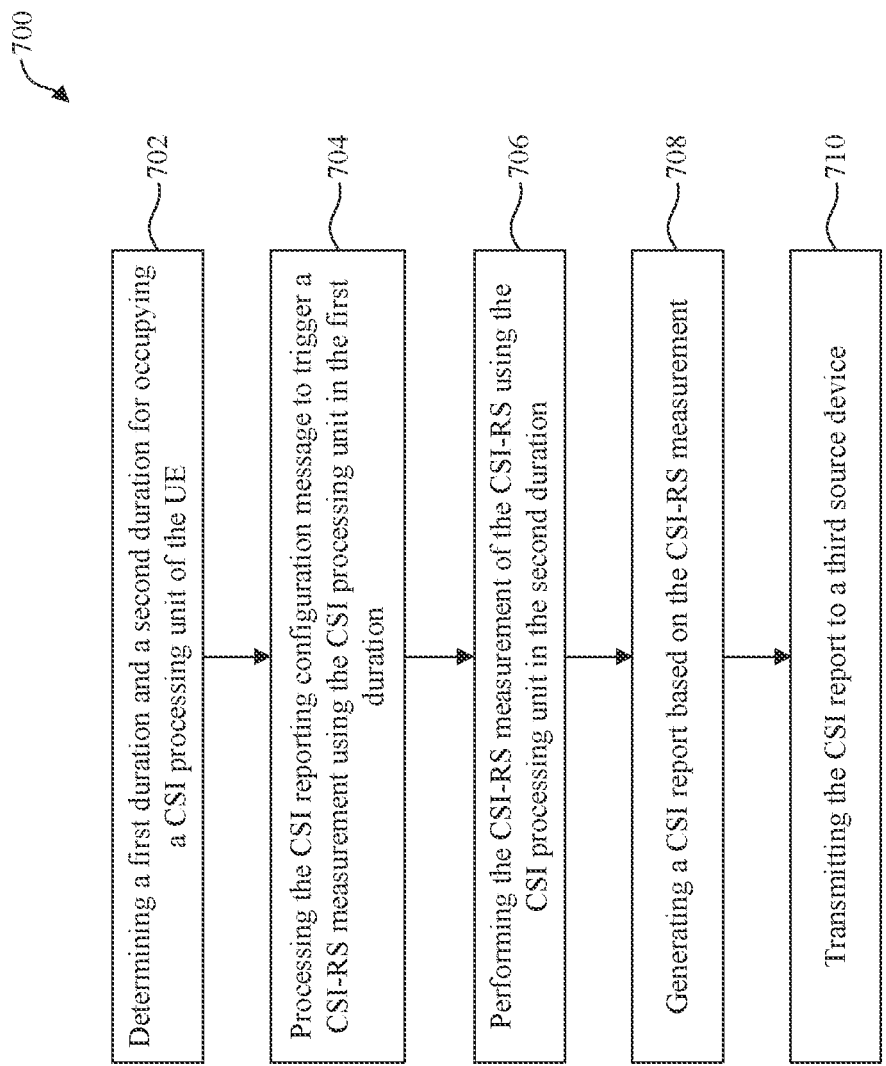
FIG. 7 illustrates an example method for a system (for example a user equipment (UE)) supporting mechanisms for cross carrier scheduling, according to some aspects of the disclosure.

FIG. 7 illustrates an example method 700 of steps 302 and 312 of FIG. 3, according to some aspects of the disclosure. As a convenience and not a limitation, FIG. 7 may be described with regard to elements of FIGS. 1, 2, and 9. Method 700 may represent the operation of an electronic device (for example, base station 101 of FIG. 1) implementing CSI capability reporting. Method 700 may also be performed by system 200 of FIG. 2 and/or computer system 900 of FIG. 9. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7.

At 702, the UE determines a first duration and a second duration for occupying a CSI processing unit of the UE. For example, the first duration may be duration 802 of FIG. 8 and the second duration may be duration 804 of FIG. 8. As discussed above, the UE's processor, such as the processor 210 of FIG. 2, may include one or more CSI processing units. For example, the UE's processor may include 10 CSI processing units, which indicates that the LTE is capable of processing 10 CSI reporting processes simultaneously.

At 704, the UE processes the CSI reporting configuration message received to trigger a CSI-RS measurement using the CSI processing unit in the first duration. As discussed above, the CSI reporting configuration message may include DCI for triggering the CSI reporting. In some aspects, the UE may deframe the CSI reporting configuration message by identifying a header and a payload of the CSI reporting configuration message. The UE may also decode and/or decrypt the payload to extract information carried by the CSI reporting configuration message. In some aspects, the deframing, the decoding, and/or the decrypting occupy the CSI processing unit for the first duration of time.

At 706, the UE performs the CSI-RS measurement of the CSI-RS using the CSI processing unit in the second duration. In some aspects, the UE may calculate CSI based on the CSI-RS received. The CSI may include, but is not limited to, channel quality indicator (CQI), precoding matrix indicator (PMI), CSI-RS resource indicator (CM), SS/PBCH (synchronization signals (SS)/physical broadcast channel (PBCH)) Block Resource indicator (SSBRI), layer indicator (LI), rank indicator (RI), and/or L1-RSRP (L1-reference signal received power) associated with at least a communication link on which the network communicates with the UE.

In some aspects, the CSI-RS measurement occupies the CSI processing unit for the second duration of time. The first time duration and the second time duration may be adjacent to each other as shown in FIG. 8.

At 708, the UE generates a CSI report based on the CSI-RS measurement. In some aspects, the UE may determine a third duration for occupying the CSI processing unit of the UE. For example, the third duration may be duration 806 of FIG. 8. The third duration may be adjacent to the second time duration as shown in FIG. 8. In some aspects, generating the CSI report occupies the CSI processing unit for the third duration of time.

At 710, the UE transmits the CSI report to a third cell. In some aspects, the UE connects to the third cell via the base station.

Figure 8:
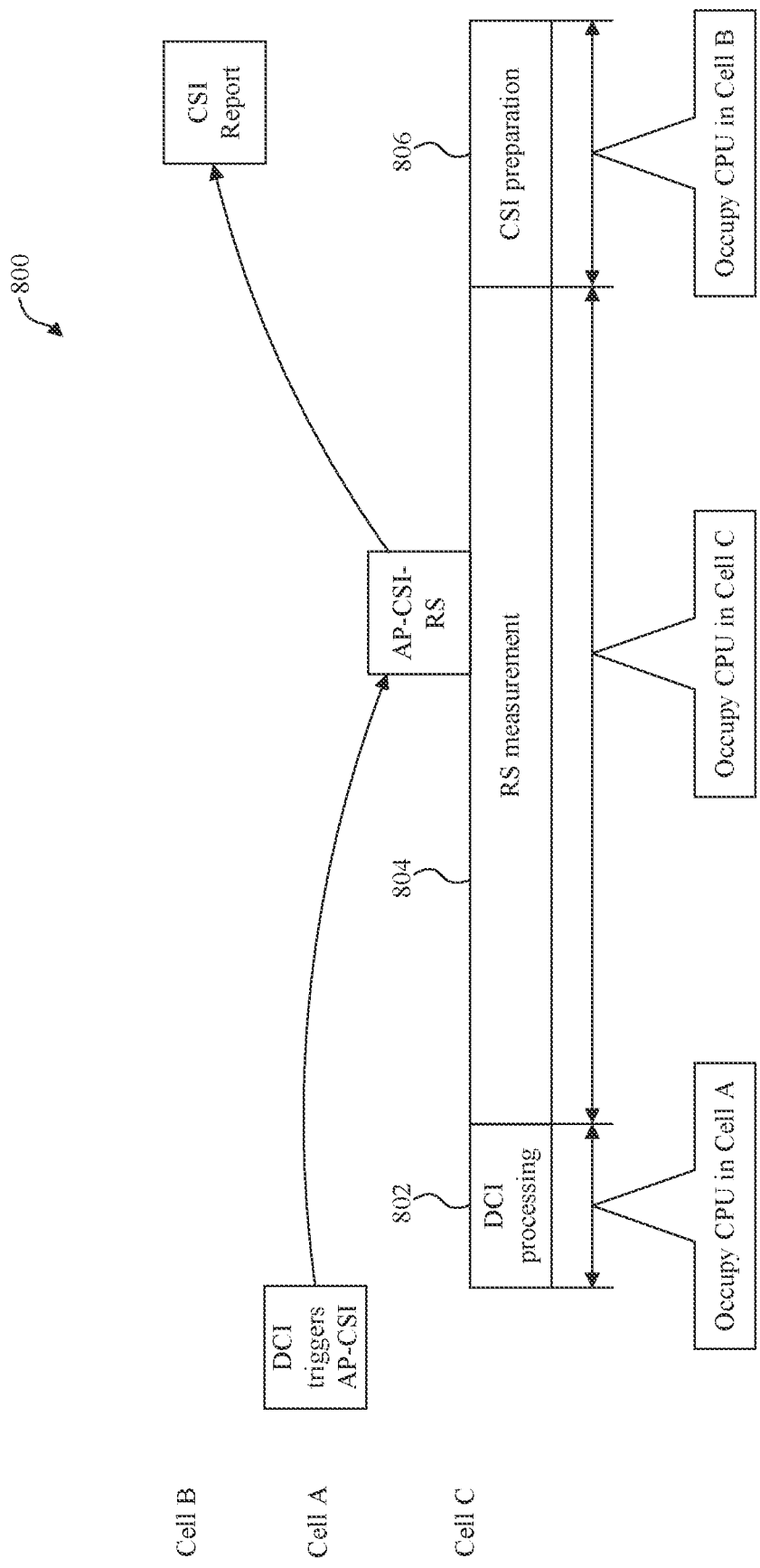
FIG. 8 illustrates an example of cross carrier scheduling of the UE, according to some aspects of the disclosure.

FIG. 8 illustrates an example of cross carrier scheduling of the UE. In some aspects, the UE connects to the first cell (cell A of FIG. 8), the second cell (cell B of FIG. 8), and the third cell (cell C of FIG. 8). The UE receives the CSI reporting configuration message, such DCI, from the first cell. The UE processes the CSI reporting configuration message to schedule the CSI-RS measurement in the second cell. The UE generates and transmits the CSI report to the third cell. In some aspects, as discussed above, computations of each cell occupies a duration of the processing unit, such as a CPU shown in FIG. 8. For example, the computations of the first cell occupy duration 802 of the processing unit. Likewise, the computations of the second cell and third cell occupy duration 804 and duration 806 respectively.

Figure 9:
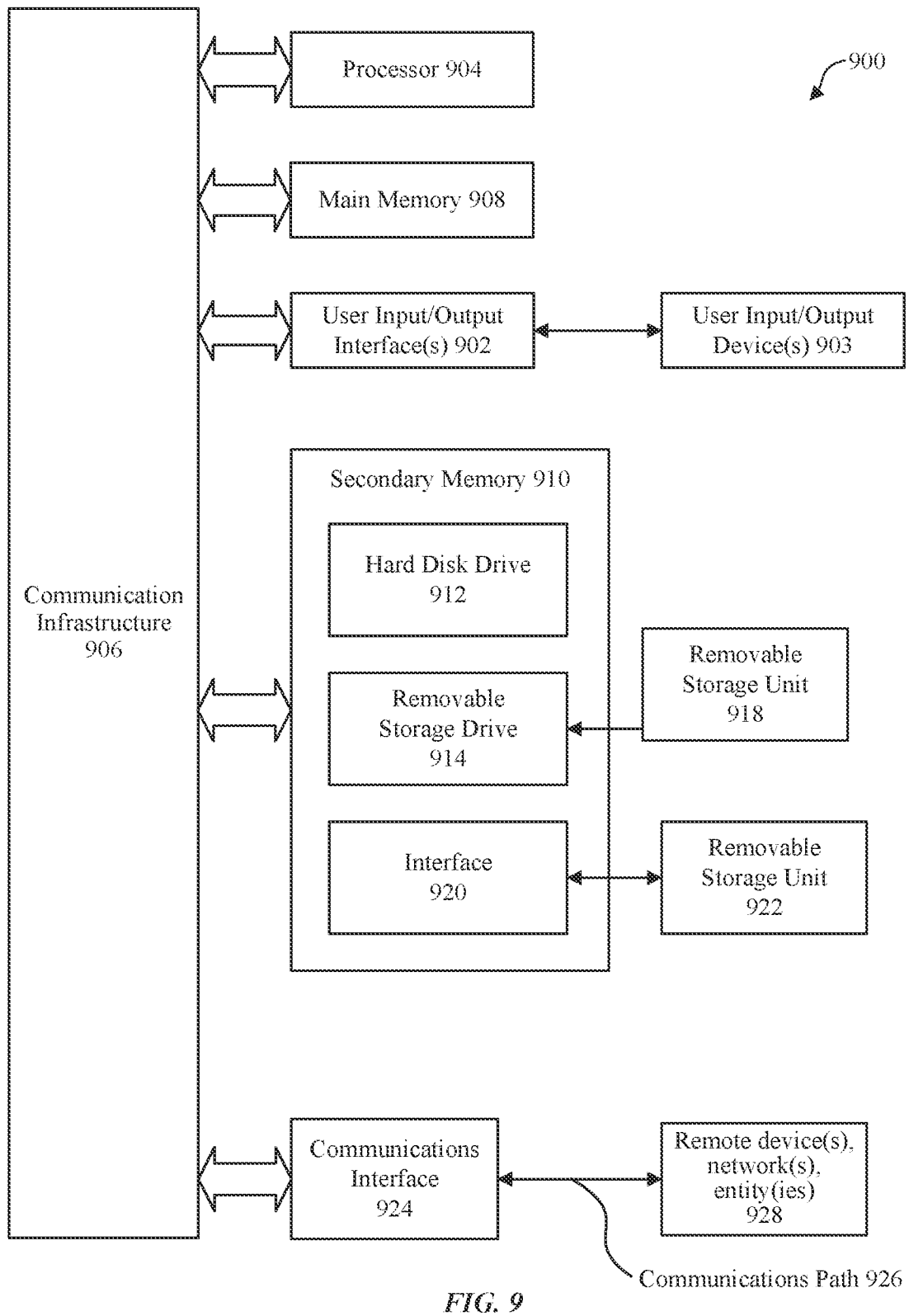
FIG. 9 is an example computer system for implementing some aspects of the disclosure or portion(s) thereof.

Various aspects may be implemented, for example, using one or more computer systems, such as computer system 900 shown in FIG. 9. Computer system 900 may be any well-known computer capable of performing the functions described herein such as devices 101, 105 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and; or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVI), optical storage disk, and/any other computer data storage device. Removable storage drive 714 reads from and/writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Examples

Example 1 may include a method comprising:
determining a first number of CSI-RS resources of a first time slot duration corresponding to the first cell;
determining a second number of CSI-RS resources of a second time slot duration corresponding to the second cell;
determining an overall time slot duration based on the first and the second time slot durations;
determining an overall number of CSI-RS resources of the overall time slot duration at least based on the first and the second number of CSI-RS resource;
generating a capability report at least based on the overall number of CSI-RS resources; and
transmitting the capability report to a source device.

Example 2 may include the method of example 1 or some other example herein, the capability report corresponds to one or more carrier components in a single band or a single band combination of a carrier aggregation.

Example 3 may include the method of example 1 or some other example herein, wherein the method further comprising:
receiving a channel state information (CSI) reporting configuration message from the first cell;
receiving a channel state information reference signal (CSI-RS) from the second cell;
determining a first duration and a second duration for occupying a CSI processing unit of the UE;
processing the CSI reporting configuration message to trigger a CSI-RS measurement using the CSI processing unit in the first duration;
performing the CSI-RS measurement of the CSI-RS using the CSI processing unit in the second duration;
generating a CSI report based on the CSI-RS measurement; and
transmitting the CSI report to a third cell via the source device.

Example 4 may include the method of example 1 or some other example herein, wherein the first time slot duration is different from the second time slot duration.

Example 5 may include the method of example 4 or some other example herein, wherein the method further comprising: comparing the first time slot duration and the second time slot duration; and determining that the first time slot duration is smaller than the second time slot duration.

Example 6 may include the method of example 5 or some other example herein, wherein the method further comprising: determining that the overall time slot duration is equal to the first time slot duration; and determining that the overall number of CSI-RS resources of the overall time slot duration is equal to a sum of the first number of CSI-RS resources and the second number of CSI-RS resources.

Example 7 may include the method of example 5 or some other example herein, wherein the method further comprising:
determining that the overall time slot duration is equal to the second time slot duration;
determining that the second time slot duration fully overlaps with a third number of the first time slot durations; and
determining that the overall number of CSI-RS resources of the overall time slot duration is equal to sum of the third number times the first number of CSI-RS resources and the second number of CSI-RS resources Example 8 may include the method of example 3 or some other example herein, wherein the method further comprising: determining a third duration; and generating the CSI report based on the CSI-RS measurement using the CSI processing unit in the third duration.

Example 9 may include the method of example 8 or some other example herein, wherein the UE connects to the third cell via the source device.

Example 10 may include the method of example 9 or some other example herein, wherein the third cell is a secondary cell.

Example 11 may include the method of example 1 or some other example herein, wherein the first cell is a primary cell, and wherein the second cell and the third cell are secondary cells.

Example 12 may include the method of example 1 or some other example herein, wherein the method further comprising:
determining one or more supported combinations of CSI-RS measurement types;
determining one or more supported combinations of CSI report types; and
generating the capability report based on the one or more supported combinations of CSI-RS measurement types and the one or more supported combinations of CSI report types.

Example 13 may include the method of example 1 or some other example herein, wherein the method further comprising:
determining one or more restricted combinations of CSI-RS measurement types;
determining one or more restricted combinations of CSI report types; and
generating the capability report based on the one or more restricted combinations of CSI-RS measurement types and the one or more restricted combinations of CST report types.

Example 14 may include the method of example 2 or some other example herein, wherein the channel state information (CSI) reporting configuration message includes downlink configuration information (DCI).

Example 15 may include the method of example 2 or some other example herein, wherein the method further comprising indicating a list of one or more cells that can trigger the CSI-RS measurement of the CSI-RS received from the source device of the second cell.

Example 16 may include the method of example 2 or some other example herein, wherein the method further comprising: receiving a CSI-RS signal from the source device; and indicating a list of one or more cells that can trigger the CSI-RS measurement of the CSI-RS receiving from the first cell.

Example 17 may include the method of example 16 or some other example herein, wherein the list of one or more cells are primary cells.

Example 18 may include the method of example 2 or some other example herein, when a CSI reporting is triggered with different CSI reports, the corresponding CSI processing unit for each CSI report is occupied on the carrier that the UE performs the CSI-RS measurement.

Example 19 may include the method of example 2 or some other example herein, when a CSI reporting is triggered with multiple CSI reports, for each ReportConfigId, all the CSI-RS for both channel measurement and interference measurement. e.g., CMR/CSI-IM/NZP-IMR, are located in a same component carrier.

Example 20 may include the method of example 2 or some other example herein, when a CSI reporting is triggered with multiple CSI reports, for all the CSI reports, all the CSI-RS for both channel measurement and interference measurement, e.g., CMR/CSI-IM/NZP-IMR, are located in a same component carrier.

Example 21 may include the method of example 5 or some other example herein, wherein the method further comprising:
  determining that the overall time slot duration is equal to the second time slot duration;
  determining that the second time slot duration partially or fully overlaps with a third number of the first time slot durations; and
  determining that the overall number of CSI-RS resources of the overall time slot duration is equal to sum of the third number times the first number of CSI-RS resources and the second number of CSI-RS resources, and
  wherein the first time slot duration and the second time duration are asynchronous.

Example 22 may include the method of example 5 or some other example herein, wherein the method further comprising:
  determining that the overall time slot duration is equal to the second time slot duration;
  determining that the second time slot duration overlaps with each of a third number of the first time slot durations by more than 50%; and
  determining that the overall number of CSI-RS resources of the overall time slot duration is equal to sum of the third number times the first number of CSI-RS resources and the second number of CSI-RS resources, and
  wherein the first time slot duration and the second time duration are asynchronous.

Example 23 may include the method of example 1-22 or another example herein, wherein the method is performed by a UE or a portion thereof.

Example 24 may include an apparatus comprising means to perform one or more elements of a method described in or related to any of examples 1-22, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 26 may include an apparatus comprising logic, modules, or circuitry to perform one or more elements of a method described in or related to any of examples 1-22, or any other method or process described herein.

Example 27 may include a method, technique, or process as described in or related to any of examples 1-22, or portions or parts thereof.

Example 28 may include an apparatus comprising: one or more processors and one or more computer-readable media comprising instructions that. When executed by the one or more processors, cause the one or more processors to perform the method, techniques, or process as described in or related to any of examples 1-22, or portions thereof.

Example 29 may include a signal as described in or related to any of examples 1-22, or portions or parts thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A user equipment (UE) in wireless communication with a source device connecting to a first cell and a second cell, comprising:
  radio front end circuitry; and
  processor circuitry coupled to the radio front end circuitry, the processor circuitry configured to:
    determine a first number of channel state information reference signal (CSI-RS) resources of a first time slot duration corresponding to the first cell;
    determine a second number of CSI-RS resources of a second time slot duration corresponding to the second cell;
    determine an overall time slot duration based on the first and the second time slot durations;
    determine an overall number of CSI-RS resources of the overall time slot duration at least based on the first and the second number of CSI-RS resources;
    generate a capability report at least based on the overall number of CSI-RS resources; and
    transmit the capability report to the source device,
    wherein the capability report corresponds to one or more carrier components in a single band or a single band combination of a carrier aggregation.

2. The UE of claim 1,
wherein the radio front end circuitry is configured to:
  receive a channel state information (CSI) reporting configuration message from the first cell; and
  receive a CSI-RS from the second cell;
wherein the processor circuitry is further configured to:
  determine a first duration and a second duration for occupying a CSI processing unit of the UE;
  process the CSI reporting configuration message to trigger a CSI-RS measurement using the CSI processing unit in the first duration;
  perform the CSI-RS measurement of the CSI-RS using the CSI processing unit in the second duration;
  generate a CSI report based on the CSI-RS measurement; and transmit the CSI report to a third cell via the source device.

3. The UE of claim 1, wherein the first time slot duration is different from the second time slot duration.

4. The UE of claim 3, wherein the processor circuitry is further configured to:
compare the first time slot duration and the second time slot duration; and
determine that the first time slot duration is smaller than the second time slot duration.

5. The UE of claim 4, wherein the processor circuitry is further configured to:
determine that the overall time slot duration is equal to the first time slot duration; and
determine that the overall number of CSI-RS resources of the overall time slot duration is equal to a sum of the first number of CSI-RS resources and the second number of CSI-RS resources.

6. The UE of claim 4, wherein the processor circuitry is further configured to:
determine that the overall time slot duration is equal to the second time slot duration;
determine that the second time slot duration fully overlaps with a third number of the first time slot duration; and
determine that the overall number of CSI-RS resources of the overall time slot duration is equal to a sum of the third number times the first number of CSI-RS resources and the second number of CSI-RS resources.

7. The UE of claim 2, wherein the processor circuitry is further configured to:
determine a third duration; and
generate the CSI report based on the CSI-RS measurement using the CSI processing unit in the third duration.

8. The UE of claim 7, wherein the first cell is a primary cell, and wherein the second cell and the third cell are secondary cells.

9. The UE of claim 1, wherein the one or more carrier components are in an FR1 frequency range or an FR2 frequency range.

10. The UE of claim 1, wherein the processor circuitry is further configured to:
determine one or more supported combinations of CSI-RS measurement types;
determine one or more supported combinations of CSI report types; and
generate the capability report based on the one or more supported combinations of CSI-RS measurement types and the one or more supported combinations of CSI report types.

11. The UE of claim 1, wherein the processor circuitry is further configured to:
determine one or more restricted combinations of CSI-RS measurement types;
determine one or more restricted combinations of CSI report types; and
generate the capability report based on the one or more restricted combinations of CSI-RS measurement types and the one or more restricted combinations of CSI report types.

12. A method performed by a user equipment (UE) in wireless communication with a source device, the method comprising:
determining a first number of channel state information reference signal (CSI-RS) resources of a first time slot duration corresponding to a first cell;
determining a second number of CSI-RS resources of a second time slot duration corresponding to a second cell;
determining an overall time slot duration based on the first and the second time slot duration;
determining an overall number of CSI-RS resources of the overall time slot duration at least based on the first and the second number of CSI-RS resources;
generating a capability report at least based on the overall number of CSI-RS resources; and
transmitting the capability report to the source device,
wherein the capability report corresponds to one or more carrier components in a single band or a single band combination of a carrier aggregation.

13. The method of claim 12 further comprising:
receiving a channel state information (CSI) reporting configuration message from the first cell;
receiving a CSI-RS from the second cell;
determining a first duration and a second duration for occupying a CSI processing unit of the UE;
processing the CSI reporting configuration message to trigger a CSI-RS measurement using the CSI processing unit in the first duration;
performing the CSI-RS measurement of the CSI-RS using the CSI processing unit in the second duration;
generating a CSI report based on the CSI-RS measurement; and
transmitting the CSI report to a third cell via the source device.

14. The method of claim 12, wherein the first time slot duration is different from the second time slot duration.

15. The method of claim 14 further comprising:
comparing the first time slot duration and the second time slot duration; and
determining that the first time slot duration is smaller than the second time slot duration.

16. The method of claim 15 further comprising:
determining that the overall time slot duration is equal to the first time slot duration; and
determining that the overall number of CSI-RS resources of the overall time slot duration is equal to a sum of the first number of CSI-RS resources and the second number of CSI-RS resources.

17. The method of claim 15 further comprising:
determining that the overall time slot duration is equal to the second time slot duration;
determining that the second time slot duration fully overlaps with a third number of the first time slot duration; and
determining that the overall number of CSI-RS resources of the overall time slot duration is equal to a sum of the third number times the first number of CSI-RS resources and the second number of CSI-RS resources.

18. The method of claim 13 further comprising:
determine a third duration; and
generate the CSI report based on the CSI-RS measurement using the CSI processing unit in the third duration.

19. The method of claim 18, wherein the first cell is a primary cell, and wherein the second cell and the third cell are secondary cells.

20. The method of claim 12, wherein the one or more carrier components are in an FR1 frequency range or an FR2 frequency range.

* * * * *